United States Patent
Padidar et al.

(10) Patent No.: US 10,423,514 B1
(45) Date of Patent: *Sep. 24, 2019

(54) AUTOMATED CLASSIFICATION OF MOBILE APP BATTERY CONSUMPTION USING SIMULATION

(71) Applicant: Symantec Corporation, Mountain View, CA (US)

(72) Inventors: Sasan Padidar, Pacifica, CA (US); Kevin Watkins, San Francisco, CA (US); Anthony John Bettini, San Francisco, CA (US)

(73) Assignee: Symantec Corporation, Mountain View, CA (US)

( * ) Notice: Subject to any disclaimer, the term of this patent is extended or adjusted under 35 U.S.C. 154(b) by 880 days.

This patent is subject to a terminal disclaimer.

(21) Appl. No.: 14/525,030

(22) Filed: Oct. 27, 2014

Related U.S. Application Data

(60) Provisional application No. 61/896,490, filed on Oct. 28, 2013.

(51) Int. Cl.
- *G06F 11/34* (2006.01)
- *H04W 52/02* (2009.01)
- *H04W 4/60* (2018.01)

(52) U.S. Cl.
CPC .......... *G06F 11/3457* (2013.01); *H04W 4/60* (2018.02); *H04W 52/0261* (2013.01)

(58) Field of Classification Search
None
See application file for complete search history.

(56) References Cited

U.S. PATENT DOCUMENTS

| | | | |
|---|---|---|---|
| 8,055,314 B2 | 11/2011 | Jin et al. | |
| 8,128,405 B2 | 3/2012 | Preston et al. | |
| 8,375,068 B1* | 2/2013 | Platt | G06Q 10/10 |
| | | | 705/7.29 |
| 8,423,095 B2 | 4/2013 | Jin et al. | |

(Continued)

FOREIGN PATENT DOCUMENTS

| | | |
|---|---|---|
| WO | 2009089374 | 7/2009 |
| WO | 2014118533 | 8/2014 |

OTHER PUBLICATIONS

Microsoft, "Managing Batter Life and Power Consumption Overview", Oct. 2013, pp. 1-3.*

(Continued)

*Primary Examiner* — Timothy A Mudrick
*Assistant Examiner* — Phuong N Hoang
(74) *Attorney, Agent, or Firm* — Patent Law Works LLP

(57) ABSTRACT

Techniques for automated classification of mobile applications ("apps") battery consumption using simulation are disclosed. In one embodiment, a system for automated classification of mobile app battery consumption using simulation includes an app analyzer for performing an analysis of the app; and a classification engine for classifying the app into a battery consumption category based on the analysis performed using the app analyzer. In one embodiment, a process for automated classification of mobile app battery consumption using simulation includes receiving an app; performing an automated analysis of the app; and generating a battery consumption score for the app based on the automated analysis of the app.

19 Claims, 5 Drawing Sheets

(56) References Cited

U.S. PATENT DOCUMENTS

| | | | |
|---|---|---|---|
| 8,509,751 | B2 | 8/2013 | Lock et al. |
| 8,612,580 | B2 | 12/2013 | Gandhi et al. |
| 8,806,647 | B1 | 8/2014 | Daswani et al. |
| 8,903,458 | B1* | 12/2014 | Ho .................... H04W 52/0261 455/572 |
| 9,229,522 | B1* | 1/2016 | Tian ...................... G06F 9/4418 |
| 9,286,568 | B2* | 3/2016 | Rhines ..................... G06N 5/02 |
| 9,513,696 | B2* | 12/2016 | Banerjee ............... G06F 1/3206 |
| 9,986,450 | B2* | 5/2018 | Gutierrez, Jr. ......... H04W 24/08 |
| 2001/0012281 | A1 | 8/2001 | Hall et al. |
| 2004/0102228 | A1* | 5/2004 | Hakamata ......... H04W 52/0261 455/572 |
| 2005/0220044 | A1 | 10/2005 | Choi et al. |
| 2007/0060211 | A1* | 3/2007 | Abdel-Kader ........ H04W 48/16 455/572 |
| 2011/0313697 | A1* | 12/2011 | Staton ................ G01R 31/3679 702/63 |
| 2012/0110174 | A1* | 5/2012 | Wootton ............... G06F 21/564 709/224 |
| 2012/0174079 | A1 | 7/2012 | Luh et al. |
| 2012/0188927 | A1* | 7/2012 | Bennett ................. H04W 52/24 370/311 |
| 2013/0326465 | A1* | 12/2013 | Jain .......................... G06F 8/77 717/100 |
| 2014/0188412 | A1* | 7/2014 | Mahajan ............... G06F 1/3206 702/63 |
| 2017/0055219 | A1* | 2/2017 | Gutierrez, Jr. .... H04M 1/72522 |

OTHER PUBLICATIONS

Fernando et al., Mobile Cloud Computing: A Survey, Future Generation Computer Systems, vol. 29, (2013), pp. 84-106, Jun. 6, 2012.

Author Unknown, Amazon Web Services, Amazon Mechanical Turk (beta), Oct. 24, 2013, retrieved from: https://web.archive.org/web/20131024023857/https://aws.amazon.com/mturk/.

Blasing et al., An Android Application Sandbox System for Suspicious Software Detection, 2010.

Liang et al., Context Virtualizer: A Cloud Service for Automated Large-Scale Mobile App Testing Under Real-World Conditions, pp. 1-14, Sep. 2013.

Mittal et al., Empowering Developers to Estimate App Energy Consumption, MobiCom'12, Aug. 22-26, 2012.

Damasevisius et al., Methods for Measurements of Energy Consumption in Mobile Devices, Metrology and Measurement Systems, Index 330930, ISSN 0860-8229, vol. XX (2013), No. 3, pp. 419-430.

Ma et al., eDoctor: Automatically Diagnosing Abnormal Battery Drain Issues on Smartphones, USENIX Association, 10th USENIX Symposium on Networked Systems Design and Implementation (NSDI 2013).

Kim et al., Detecting Energy-Greedy Anomalies and Mobile Malware Variants, MobiSys'08, Jun. 17-20, 2008.

Albert et al., Fall Classification by Machine Learning Using Mobile Phones, PLOS ONE, May 7, 2012.

Chandra et al., Towards Scalable Automated Mobile App Testing, Microsoft Research, Jan. 2014.

* cited by examiner ated CLASSIFICATION
AUTOMATED CLASSIFICATION OF MOBILE APP BATTERY CONSUMPTION USING SIMULATION

CROSS REFERENCE TO OTHER APPLICATIONS

This application claims priority to U.S. Provisional Patent Application No. 61/896,490, entitled CLASSIFICATION OF MOBILE APP BATTERY CONSUMPTION USING SIMULATION filed Oct. 28, 2013, which is incorporated herein by reference for all purposes.

BACKGROUND OF THE INVENTION

An application, also referred to as an "app," generally refers to a software application that executes on a computing device, such as a mobile device. For example, mobile devices include smart phones, phablets, tablets, laptops, and/or other mobile devices. Various application platforms exist for different operating systems, such as Apple iOS® platforms, Google Android® platforms, and Microsoft Windows® platforms. Application markets exist for each of these application platforms, which can make available thousands to millions of different apps for such platforms.

For example, various apps are available for executing on smart phones such as the Apple iPhone® or Google Nexus® phones, tablets such as the Apple iPad® or Google Nexus® tablets, iOS smart watches being developed by Apple and Android smart watches being developed by Google Android® operating system smart watch vendors, embedded devices executing the Google Android® operating system such as those shipped by Mentor Graphics and their partners, and computer operating systems such as Apple Mac OS X® and Microsoft Windows 8®.

BRIEF DESCRIPTION OF THE DRAWINGS

Various embodiments of the invention are disclosed in the following detailed description and the accompanying drawings.

DETAILED DESCRIPTION

Figure 1:
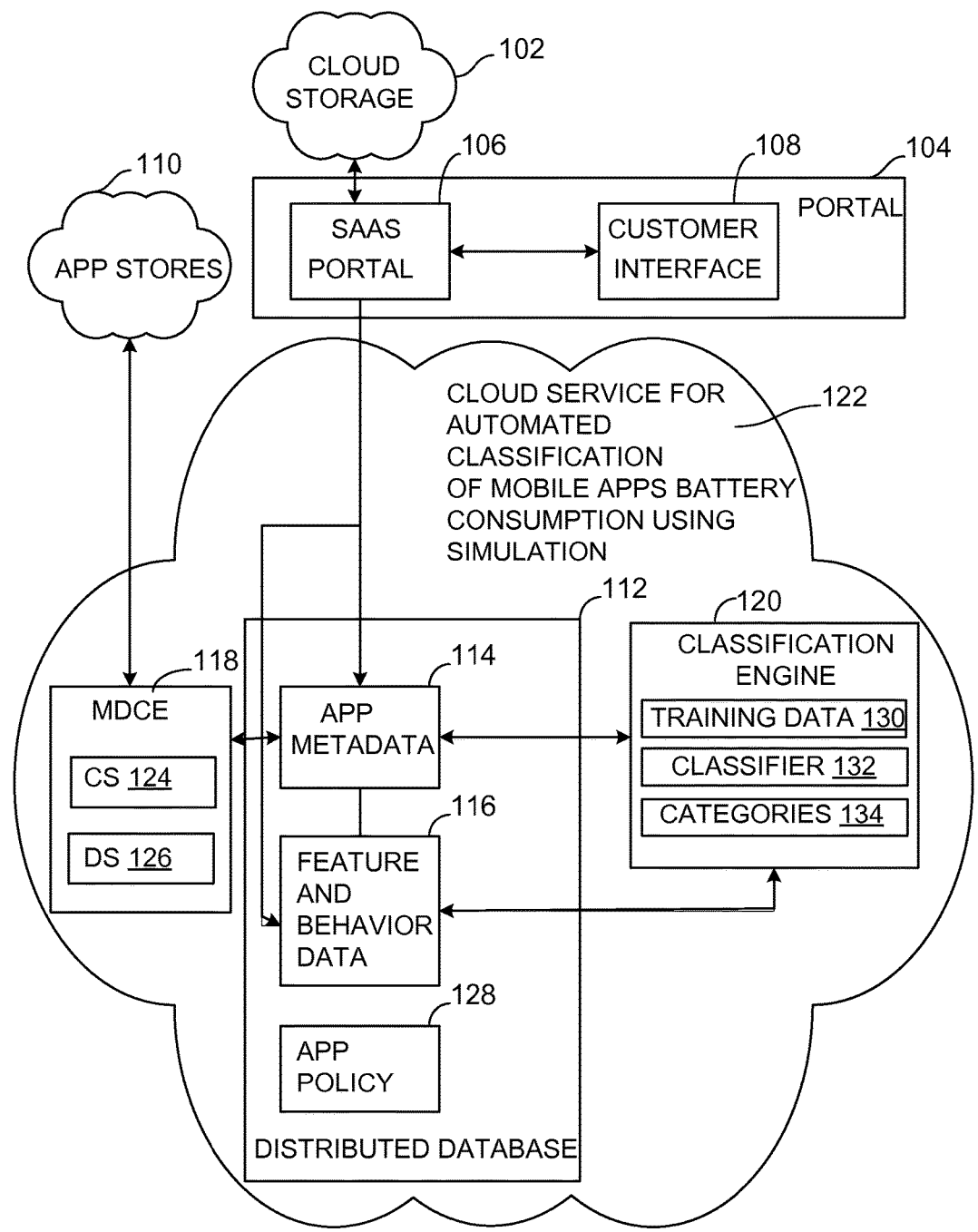
FIG. 1 is a functional block diagram of a cloud service for providing automated classification of mobile applications ("apps") battery consumption using simulation in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An application, also referred to as an "app," generally refers to a software application that executes on a computing device, such as a mobile device. For example, mobile devices include smart phones, phablets, tablets, laptops, and/or other mobile devices. Various application platforms exist for different operating systems, such as Apple iOS® platforms, Google Android® platforms, and Microsoft Windows® platforms. Application markets exist for each of these application platforms, which can make available thousands to millions of different apps for such platforms.

For example, various apps are available for executing on smart phones such as the Apple iPhone® or Google Nexus® phones, tablets such as the Apple iPad® or Google Nexus® tablets, iOS smart watches being developed by Apple and Android smart watches being developed by Google Android® operating system smart watch vendors, embedded devices executing the Google Android® operating system such as those shipped by Mentor Graphics and their partners, and computer operating systems such as Apple Mac OS X® and Microsoft Windows 8®.

As the app ecosystem increases, apps are increasing in number and are becoming a significant source for battery drain (e.g., battery usage/consumption) on mobile devices (e.g., smart phones, phablets, tablets, smart watches, laptops, and/or other mobile computing devices). In addition, the number and variety of mobile device manufacturers and number and variety of mobile device hardware offerings continue to increase.

However, conventional approaches for measuring an app's power consumption (e.g., an app's battery consumption/usage) generally require testing the app by executing the app on the mobile hardware for determining power measurements. As such, conventional approaches for measuring an app's power consumption do not adequately scale for testing thousands to millions of different apps that are available for mobile devices.

For example, conventional approaches for collecting information about app battery consumption that require analyzing the app executing on a physical mobile device (e.g., mobile device hardware) are generally time consuming (e.g., performing such analysis, for example, for 24 hours or longer on physical mobile device hardware). Thus, conventional approaches for collecting information about app battery consumption that require analyzing the app executing on a physical mobile device are both time consuming and costly in terms of computing resource utilization for performing such lengthy analysis on physical mobile device hardware.

Also, in certain cases, collecting information about app battery consumption can depend on a mobile device's environmental conditions that could increase or decrease the amount of battery consumed by the app. For example an app may behave differently when a Wi-Fi network access is enabled compared to when the Wi-Fi network access is disabled on the mobile device, and the only mechanism of connecting to the Internet is via the cellular provider mobile Internet connection. Acquiring this type of data about an app means that the app generally has to be executing on a mobile device for a certain period of time. To make the data as accurate as possible, the app can be executed under several conditions, such as with Wi-Fi enabled and disabled, and then data can be collected about its behavior and its effect (e.g., impact) on the battery consumption (e.g., battery usage behavior during the various test conditions can be recorded). As a result, this generally makes collecting this type of data about an app time both consuming and error prone due to the various possible states the mobile device can be in that may or may not have been exhaustively tested.

As such, as the number of apps available continues to increase, organizations such as enterprises and end-users would benefit from a mechanism that can efficiently identify and categorize apps based on their battery consumption. The process of classifying apps based on their characteristics and/or behaviors has traditionally been a manual process that is generally time consuming and costly in terms of resource usage, and as a result, is generally impractical for a large number of apps.

What are needed are more efficient and effective techniques for classifying apps based on their battery consumption.

Accordingly, techniques for providing automated classification of mobile app battery consumption using simulation are disclosed. In particular, various techniques for automating classifications of apps based on their battery consumption are disclosed (e.g., without the need of executing and testing each of the apps on each of the mobile devices). For example, techniques are provided that simulate battery consumption (e.g., battery usage) and calculate a battery consumption score for each app (e.g., that is not dependent on physical or mobile hardware). Also, such techniques are highly scalable and, for example, can categorize battery consumption of a large number of apps in a short period of time. In addition, techniques disclosed herein can increase the accuracy of an estimation of battery consumption by a given app.

Battery Discharge Simulation

Data collection about app battery consumption (e.g., battery usage) can be performed on physical mobile devices. However, discrepancies between mobile devices can potentially contaminate the data. This type of data collection can also happen on an emulated mobile device platform with a controlled environment that collects the same data for each app installed on the emulated mobile device platform. The challenge this introduces is that no actual battery exists in the emulated mobile device platform, which means that the battery usage information provided by the emulated mobile device platform (e.g., emulated mobile operating system (OS)) may be irrelevant.

However, using the information that a specialized emulated mobile device platform as disclosed herein can monitor behaviors of the app in the emulated mobile device platform effectively allows the actual battery usage of the app to be calculated based on the app behavior observed and recorded using the specialized emulated mobile device platform. In one embodiment, a system for providing automated classification of mobile app battery consumption using simulation is designed to monitor app behavior using an emulator (e.g., emulated mobile device platform that emulates a particular mobile OS environment) and calculate a battery consumption score (e.g., battery usage score) for the app based on the monitored behavior in the emulator (e.g., based on dynamic analysis of the app using the emulator). In some cases, static analysis of the app can also be performed to facilitate a battery consumption categorization.

Mobile applications can behave in ways that make each application unique when focusing on, for example, one or more behaviors performed by the application (e.g., app behaviors). For example, generalizations can be used in order to classify an app to a particular category based on one or more app behaviors. These behaviors can be automatically analyzed to determine similarities with other mobile applications, which can be applied using various techniques as described herein to categorize/group such mobile applications into various battery consumption categories, such as high battery consumption, medium battery consumption, low battery consumption, and/or other battery consumption related categories/groups, which can be implemented automatically (e.g., without having to manually categorize these groups, which would require human intervention). As another example, various features associated with the app can also be identified as an attribute that can be used to facilitate an automated classification of the app into one or more app categories based on battery consumption characteristics and/or attributes.

In one embodiment, a system for automated classification of mobile app battery consumption using simulation includes an app analyzer for performing an analysis of the app; and a classification engine for classifying the app into a battery consumption category based on the analysis performed using the app analyzer.

In one embodiment, the classification engine is further configured to automatically classify the app into the battery consumption category using the classification engine.

In one embodiment, the classification engine is further configured to automatically classify the app with a probability value that the app is associated with the battery consumption category based on the analysis performed using the app analyzer.

In one embodiment, the app analyzer further includes a dynamic analyzer for performing a dynamic analysis of the app. For example, the dynamic analysis of the app can include triggering a battery discharging action performed by the app.

In one embodiment, the app analyzer further includes a static analyzer for performing a static analysis of the app. In an example implementation, at least one input to the dynamic analysis of the app is based on results from the static analysis of the app performed by the static analyzer.

In one embodiment, the system further includes an apps battery consumption training system for generating a training data set, in which the training data set is generated by performing a dynamic analysis of a plurality of apps to test battery consumption of each of the plurality of apps in a user emulated app execution environment. For example, the battery consumption score for the app can be determined by the classification engine using the training data set.

In one embodiment, the system further includes a reporting engine for generating a report with a battery consumption categorization for the app and/or battery consumption score for the app. For example, the report can include at least one suggested app as an alternative to the app that is not approved based on the battery consumption for the app. As another example, the report can include at least one blacklisted app and at least one whitelisted app suggested as an alternative to the blacklisted app, in which the blacklisted app is blacklisted based on a battery consumption usage/categorization that is in violation of the app policy. In some cases, the app policy can be an enterprise app policy (e.g., an app policy configured by an enterprise for managing apps on mobile devices associated with the enterprise based on battery consumption categorizations/scores).

In one embodiment, a process for automated classification of mobile app battery consumption using simulation includes receiving an app; performing an automated analysis of the app; and generating a battery consumption score for the app based on the automated analysis of the app. In one embodiment, the process further includes classifying the app into a battery consumption category using a classification engine. In one embodiment, the process further includes classifying the app with a probability value that the app is associated with the battery consumption category using the classification engine. In one embodiment, the process further includes performing a dynamic analysis of the app during the automated analysis of the app.

For example, techniques for automated classification of mobile app battery consumption using simulation can be used by an entity, such as a company (e.g., ACME Company) that is concerned with ensuring that users (e.g., employees and/or other users) who use various mobile devices to perform work related activities (e.g., in some cases, such may be mobile devices, such as smart phones, phablets, tablets, smart watches, and/or laptops, that are issued to employees by the company, and in other cases, such may be mobile devices that employees purchase and bring to work, in bring your own device to work IT models, etc.), to ensure that apps that are available from public app stores or other app marketplaces (e.g., including any private app stores, such as hosted by ACME Company or other entities) do not violate ACME Company's app policy (e.g., ACME Company can configure an enterprise app policy that specifies approved apps and unapproved apps based on battery consumption). ACME Company can identify a BAD-Productivity app as high battery usage, and suggest as an alternative, an approved GOOD-Productivity app that ACME Company specifies in its enterprise app policy to be an acceptable low battery usage productivity app (e.g., the policy can suggest low battery usage map, calendar, or other productivity apps as alternatives to apps in such categories that are determined to be high battery usage apps). In this example, a BAD-Productivity app can be determined to be unacceptable/undesirable based on battery usage related attributes (e.g., including app behaviors or various features), such as high battery usage.

These and various other examples for applying techniques for automated classification of mobile app battery consumption using simulation are discussed below with respect to various embodiments.

Overview of a Cloud Service for Providing Automated Classification of Mobile App Battery Consumption Using Simulation FIG. 1 is a functional block diagram of a cloud service for providing automated classification of mobile applications ("apps") battery consumption using simulation in accordance with some embodiments. As shown, cloud service for automated classification of mobile app battery consumption using simulation 122 receives apps from app stores 110 (e.g., apps can be pushed or pulled from such app stores, such as using an API for batch jobs to download one or more apps for analysis). Example app stores can include public app stores (e.g., Google PlayStore, Apple App store, and/or other public app stores) and/or private app stores (e.g., ACME Company can have a private app store for employees or other users of ACME Company to access apps for their mobile devices). As also shown, cloud service 122 is in communication with a portal 104, which is in communication with cloud storage 102.

As further described below, cloud service 122 can perform an analysis of the app using classification engine 120 (e.g., the classification engine can be implemented in software that is executed on a processor) and determine a battery consumption category for the app based on the analysis performed using the classification engine. Example battery consumption categories can include high battery consumption, medium battery consumption, low battery consumption, and/or other battery consumption categories (e.g., high GPS battery consumption, medium CPU battery consumption, low screen battery consumption, etc.). In an example implementation, a given app can be classified into one or more app categories (e.g., in some cases, calculating probabilities/scores for associating the app with each of the one or more categories, such as an app being classified with a high probability that the app is a medium battery consumption category and medium GPS battery consumption, etc.).

In one embodiment, an architecture for providing automated classification of apps for mobile devices includes a Metadata Collection Engine (MDCE) 118, End User Portal and interface (EUP or portal) 104, and Classification Engine 120, which can facilitate determining whether an analyzed app can be classified into one or more battery consumption categories. As shown, MDCE 118 and classification engine 120 are implemented as part of a cloud service 122. For example, portal 104 and cloud service 122 can be provided as a web service or cloud service, which can be executed on one or more servers that include one or more processors for executing software implemented functions (e.g., using a hosted service provider, such as Amazon Web Services (AWS), HP Helion® cloud services, IBM cloud services, or another service provider).

As shown in FIG. 1, while presented as sequential process steps, such process steps can be performed asynchronously. MDCE 118 is implemented as a part of a cloud service for automated classification of apps for mobile devices, shown as cloud service 122. In particular, MDCE 118 scrapes and downloads apps from app stores. For each app, MDCE 118 analyzes the app (e.g., using various static and dynamic techniques, such as described herein, to extract one or more behaviors, features, and/or other attributes of the app), extracts metadata from the app, and stores the extracted app metadata 114 in a distributed database 112 (e.g., or another form of a data store) for the cloud service. For example, MDCE 118 can automatically extract features from an app (e.g., an app for an iOS platform, Android platform, Microsoft platform, and/or other mobile device operating system/device platform) and/or from the market place source of the app, including one or more of the following: app origin/source information (e.g., metadata associated with the marketplace source for the app, such as a category of the app in the app store (such may be used as an indicator of a general app type/category identifier for the app, such as productivity app (email, calendar, etc.), gaming app, social network app, payment app, etc.) and/or a distributor), comments, and/or other information associated with the source of the app in a public app store or other source of the app, images, executable code (e.g., native binary), script or source code, included files, HTML (e.g., HTML files), text (e.g., text files), images (e.g., image files), video (e.g., video files), audio (e.g., audio files), embedded files, compressed archives, certificates/signed files, advertising identifiers, SDKs used in the app, authentication server identifiers, GUI/screen shots of various stages of the app during execution, and/or other features or attributes that can be extracted from the app during static and/or dynamic analysis. MDCE 118 stores such extracted features of the app in app metadata 114.

For example, a user, such as a security/network administrator, for a customer of the cloud service for automated classification of mobile app battery consumption using simulation can visit portal 104 by interacting with a customer interface 108 of a software as a service (SAAS) portal 106 to input various policy information associated with an entity (e.g., customer's company, such as ACME Company). For example, the user can input battery consumption rules for apps (e.g., warn or block install/usage of apps that are categorized as high battery consumption or warn or block install/usage of gaming apps that are categorized as high or medium battery consumption) that can be applied as an enterprise policy using various techniques described herein. As another example, the user can input various approved/whitelisted or unapproved/blacklisted apps for each app category that can be applied as an enterprise policy using various techniques described herein. The various feature and behavior information that is configured (e.g., as policy criteria) and/or extracted (e.g., based on app analysis to provide any such feature and behavior information related to the app) is stored in feature and app behavior data 116 of distributed database 112. As further described below, a classification engine 120 of cloud service for providing automated classification of mobile apps battery consumption using simulation 122 uses app metadata 114 and feature and behavior information 116 to automatically classify the analyzed apps based on training data 130 using classifier 132 to classify each of the analyzed apps into one or more battery consumption categories 134. As further described below, cloud service for providing automated classification of mobile apps battery consumption using simulation 122 can also generate a report that identifies any apps that were determined to be in violation of an app policy and/or an app policy for the entity (e.g., an enterprise app policy) based on battery consumption related rules/policies, and the report is output to the user using portal 104 (e.g., the report can identify the apps and any supporting data that triggered a battery consumption related violation of the policy by such apps, such as which apps are blacklisted based on battery consumption for a given app category (productivity, gaming, social, payment, etc.) and suggested apps that are whitelisted based on battery consumption for that app category, and/or other information, such as why a particular app is blacklisted or in violation of the app policy (high battery consumption and/or high camera battery consumption, etc.)). As also shown, portal 104 is in communication with cloud storage 102 for storing, for example, customer reports, customer preferences and user information, and/or other information.

In one embodiment, classification engine 120 of cloud service for providing automated classification of mobile apps battery consumption using simulation 122 uses app metadata 114 and feature and behavior data 116 to classify an analyzed app into one or more battery consumption categories 134 using training data 130 and classifier 132, such as further described below, and to determine whether the app is in violation of an app battery consumption related policy (e.g., the app battery consumption related policy can also be stored in distributed database 112, shown as app policy 128). For example, classification engine 120 can perform various techniques as described herein to determine whether the app is in violation of an app policy and/or an enterprise app policy. Based on a classification of each analyzed app and by applying the app policy, a report can be generated that identifies any apps that are in violation of the app policy and/or the enterprise app policy. For example, the report can include a battery consumption score (e.g., a probability score) based on the analysis for each app of whether the app can be classified into a specified battery consumption category or classification. If an app's probability score exceeds or meets a threshold (e.g., a score determined to indicate a high probability of a match), then the app can be determined to be associated with a particular battery consumption category or classification (e.g., if the probability score exceeds 75% or some other threshold value that the analyzed app is similar to other apps that were determined to exhibit high battery consumption based on the training data, then the analyzed app can be categorized into a high battery consumption category, and the policy for high battery consumption apps can be applied to the analyzed app to determine whether or not the analyzed app violates the app policy requirements for high battery consumption related apps, such as allows for productivity apps but blocks/warns for other types of apps, such as games, social networking, or other types of apps). The app(s) (if any) determined to be in violation of the app policy and the probability score (if any) can be stored in feature and behavior data 116, which can then be used for reporting to the entity using portal 104. In one implementation, portal 104 includes a report generation interface that shows the customer the apps (e.g., along with supporting data) determined to be in violation of the app policy for the entity, including the app battery consumption categorization and particular rule/policy violations based on the app policy.

In one embodiment, MDCE 118 scans applications in an automated manner to determine what data is included within the application. This data (e.g., app metadata) is extracted, stored, and used by classification engine 120 to facilitate further analysis (e.g., dynamic and/or static analysis, such as further described below) and/or classification of the app. For example, the app can include a collection of files that accompany the app, including executable code, resources, and all data contained within the application package. MDCE 118 can scan the app and can extract various data including, for example, the following: images, strings, keywords and phrases, URLs, email addresses, phone numbers, databases, Software Development Kits (SDKs) in use, and any other attributes and/or identifying information that may be used to facilitate classifying the app into one or more battery consumption categories. The extracted data can also be scanned and analyzed (e.g., decoded, parsed, and/or dissected) to determine whether the app is in violation of the app policy for the entity. In one embodiment, the application is analyzed both statically and dynamically to facilitate automated classification of mobile apps battery consumption using simulation, such as further described below.

In an example implementation, if an app is determined to be an office productivity app but is also determined to be in violation of ACME Company's battery consumption policy, then the app can be reported for removal from ACME Company's private app store and/or for automated removal from mobile devices associated with ACME Company (e.g., mobile devices managed by ACME Company for its users, such as employees and/or contractors). In some cases, an alternative app(s) that is approved by ACME Company's battery consumption policy for the office productivity category can be suggested to users who attempt to download/install or had removed the app that was determined to be in violation of the enterprise app policy for ACME Company (e.g., using an enterprise MDM service that can be configured to remove the identified/specified app from one or more managed mobile devices).

In another example implementation, ACME Company can also initially configure and periodically update a list of authorized apps based on the battery consumption category (e.g., or for all app categories, global policy requirements) associated with ACME Company using portal 104. The reports can also provide customers such as ACME Company an opportunity to provide a feedback loop to verify which reported apps are actual violations of their app policy and which are authorized apps and/or are false positives (e.g., are reported as potential battery consumption violations, which can be indicated by a confidence metric in the battery consumption violations report, but are not actual violations, for example, the app may be misclassified as a high battery consumption app when it is actually a low battery consumption app, which can be used to improve subsequent analysis performed by the classification engine). Accordingly, the reporting and evaluating of reported app violations using portal 104 can provide for a feedback loop that can improve future results generated by cloud service 122.

In one embodiment, MDCE 118 includes multiple scanner engines, including a continuous scanner (CS) 124 and a desktop scanner (DS) 126, and also is in communication with distributed database 112 as shown. For example, the scanner engines can be run within cloud 122 (e.g., or can be implemented using other execution environments). In some implementations, the scanner engine results can be stored in a high performance database relating to the application metadata, shown as app metadata 114, accessible by all of the instances of the scanner engines currently in operation. As also shown, app metadata 114 is used in conjunction with feature and behavior data 116 by classification engine 120 to determine whether the app is in violation of an app policy (e.g., based on battery consumption characteristics of the app).

In one embodiment, CS 124 visits (e.g., periodically or based on a customer's request for an updated report) official and unofficial app markets (e.g., public and/or private app marketplaces, and/or various other unofficial sources of apps available via the Internet or World Wide Web), automatically downloads apps (e.g., without user intervention), and then automatically analyzes the downloaded apps to categorize the apps into one or more battery consumption categories 134. For example, CS 124 can perform various techniques as described herein for extracting features of the app to provide app metadata to app metadata store 114. This scanning can occur periodically or continually across app markets in a particular geography and/or for app markets around the world. In one implementation, when a scan of an app is conducted by CS 124 of MDCE 118, in addition to storing app metadata as described above, CS 124 can also determine and store one or more of the following: a date and time of the scan; a version of the application; a snapshot of the app market page advertising the app (e.g., source page from which the app was advertised/available for download from the source app store); a URL of the app store from which the application was downloaded; and any other data that is relevant to or indicates an application version, origin, or description of the app (e.g., developer related information, comments or reviews about the app on the app store, and/or other information). In some cases, if a newer version of the app has new content or behavior that changes a classification of the app (e.g., or probability score values of any such app classifications) and/or violates an app policy, then a new entry can be created within distributed database 112 to record how the app has changed in this newer version and that such triggered a new or additional app classification and/or if such triggered a new or additional app policy violation.

In one embodiment, classification engine 120 includes training data 130 that is used by classifier 132 to facilitate an automated classification of an analyzed app into one or more battery consumption categories 134, such as further described below. In one implementation, the analyzed app is classified based on a probability score, in which the probability score is generated to provide an indicator that the analyzed app is associated with a particular battery consumption category. For example, if the analyzed app has a probability score value for the high battery consumption category that exceeds a threshold value (e.g., 75% or some other value), then the analyzed app can be associated with the high battery consumption category. In some cases, the analyzed app can be associated with two or more battery consumption categories, such as if the analyzed app has probability score values associated with two or more app categories that each exceed the threshold value (e.g., the analyzed app can be associated with the high battery consumption category and can also be associated with a more granular category, such as high GPS battery consumption, and/or, in some cases, the highest probability score value can be used to provide a primary app category (dominant battery consumption category, such as high/medium/low battery consumption) for the analyzed app, with the other categories being provided as secondary app categories for the analyzed app (secondary or more granular battery consumption categories, such as high/medium/low CPU/GPS/NFC/camera/etc. battery consumption)). In one implementation, the potential battery consumption categories are pre-configured based on an app policy. In another implementation, the potential battery consumption categories are pre-configured based on an enterprise app policy. For example, threshold probability score settings can also be configured based on an app policy and/or an enterprise app policy.

As further discussed below, the app policy and/or enterprise app policy can also configure various other requirements/criteria for apps based on the battery consumption category(ies) associated with the app as well as based on whitelists/blacklists of apps, and/or based on the battery consumption categories and/or other behaviors/features associated with the apps. For example, an (enterprise) app policy can specify rules based on a battery consumption category and an app type, such as whether the app is a social app, a game app, a messaging app, an office productivity app, a web browsing app, and/or any other category/type of app (e.g., block/warn for high battery consumption apps that are social apps and/or game apps, etc.).

In one embodiment, portal 104 has multiple interfaces including the following: a policy specification interface and a report generation interface. In one embodiment, the report generation interface shows the user which apps are in violation of an app policy for the entity. For example, classification engine 120 can continually or periodically update the reports as new scans of apps are completed. In one implementation, a user is able to specify alerts if an app is determined to violate the entity's enterprise app policy. For example, the report can include a sorted list of apps based on battery consumption classification.

For example, the report generation interface can report app violations for ACME Company. The report can include a list of apps and source (e.g., app stores from which such apps can be downloaded), including a score, and extracted features that triggered policy violations for ACME Company's app policy that has certain criteria/requirements for apps based on the battery consumption category. In some cases, the report can include a confidence metric for each app violation (e.g., pairwise compare for each feature, threshold requirements for each feature compare, features can have different weights, such as certain battery consumption related behaviors can be indicated as critical behaviors). In one implementation, customers can configure or customize such priorities/weights. Also, a customer can provide feedback to a report by re-categorizing an analyzed app, by categorizing certain reported violations as, for example, a verified violation, a potential violation, or not a violation, and/or to allow users of the customer to include evaluation notes, and/or to adjust weighting/scoring and/or features of interest based on the report to provide a feedback loop to improve future app violation reporting results. As another example, the customer can verify whether one or more apps in an app violation list are policy violations or not (e.g., the app can be whitelisted and/or blacklisted in the app policy).

In one embodiment, the report generation interface includes a programmatic interface (e.g., a RESTful API) to allow customers to request app violation updates/reports, receive a feed of violation updates/reports, respond to app violation updates/reports, and/or upload apps for automated battery consumption categorization by the cloud service. For example, the report generation interface can allow customers to provide features manually or to provide apps for automated analysis as described above. By providing such an interface to the report generation interface, customers can integrate these services into their own customized user interface for interacting with the cloud service for providing automated classification of mobile apps battery consumption using simulation.

In one implementation, the classification engine 120 implements various classification models and algorithmic techniques as further described below with respect to FIGS. 2 and 3. In an example implementation, the app meta data is stored in a data store (e.g., using an open source database, such as JSON or Apache Lucene, or other open source or commercially available databases). For certain formats of content, different databases can be used for storing and search such content, such as for images and searching or other representations.

Figure 2:
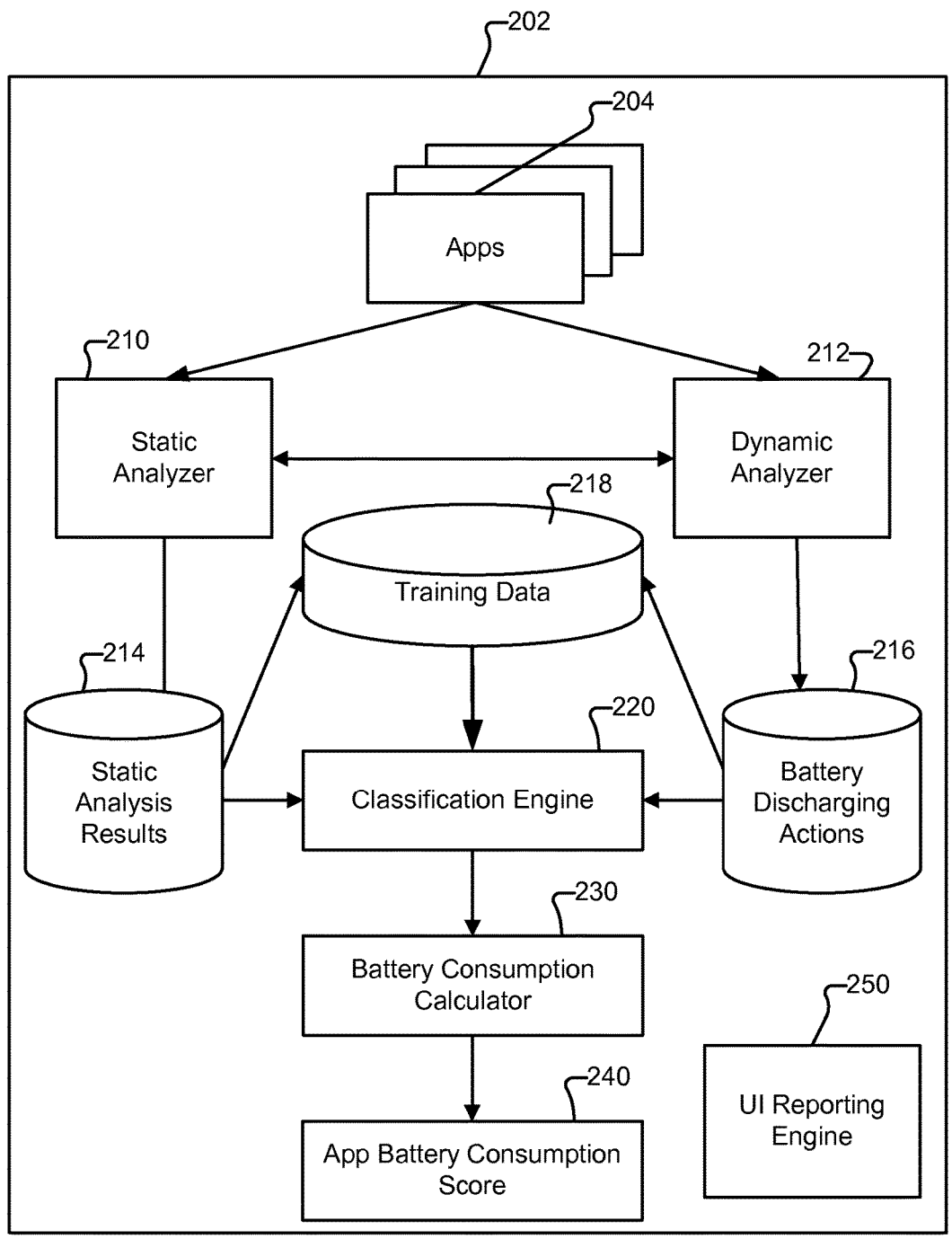
FIG. 2 is a functional block diagram of a system architecture for providing automated classification of mobile apps battery consumption using simulation in accordance with some embodiments.

Overview of a System for Performing Automated Classification of Mobile App Battery Consumption Using Simulation FIG. 2 is a functional block diagram of a system architecture for providing automated classification of mobile apps battery consumption using simulation in accordance with some embodiments. In particular, FIG. 2 illustrates a diagram that depicts components of an example implementation of a system 202 for classification of mobile apps battery consumption using simulation and demonstrates the relationships between these components, such as for implementing classification engine 120 as shown in FIG. 1, in accordance with some embodiments. As shown, apps 204 are analyzed using static analyzer 210 to generate static analysis results data store 214 and also analyzed (e.g., in parallel in some cases) using dynamic analyzer 212 to generate dynamic analysis results shown as battery discharging actions data store 216. As also shown, classification engine 220 is in communication with a data store (e.g., a database or other type of data store) that stores app training data shown as training data 218, and is also in communication with static analysis results data store 214 and battery discharging actions data store 216 to facilitate automated classification of one or more mobile apps (apps) 204 into a battery consumption category using battery consumption calculator 230 to generate an app battery consumption score 240, as further discussed below.

In one embodiment, static analyzer 210 and dynamic analyzer 212 are in communication with each other to facilitate providing respective static analysis results and dynamic analysis results as input to each other, such as described herein with respect to various embodiments. For example, if static analysis indicates that an app performs GPS calls, then the dynamic analyzer can be configured to attempt to trigger such GPS calls. As another example, if dynamic analysis indicates that an app performs high CPU usage, then the static analyzer can be configured to attempt to determine if any infinite loops are present in the code of the app and/or whether the app includes code for executing potentially CPU intensive operations (e.g., whether the apps include code for executing certain encryption/decryption related functions, etc.).

In one embodiment, static analysis results data store 214 and battery discharging actions data store 216 are also in communication with training data 218 to also provide additional/refined training data (e.g., which can be used as a feedback loop to improve performance of machine learning and other app classification algorithm techniques), as also further discussed below.

In one embodiment, system 202 also includes a user interface (UI) reporting engine 250. For example, UI reporting engine 250 can report app battery consumption scores and/or app battery consumption categorizations, such as described herein with respect to various embodiments. As another example, UI reporting engine can report app battery consumption related policy violations, such as described herein with respect to various embodiments.

In one embodiment, system 202 for providing automated classification of mobile app battery consumption using simulation includes static analyzer 210 and dynamic analyzer 212 components for performing various data collection functions and a classification engine for classifying apps into one or more battery consumption categories, such as described herein with respect to various embodiments.

In one embodiment, dynamic analyzer 212 performs dynamic analysis of apps to identify various behaviors, such as detecting and identifying various battery discharging actions, which can be collected and stored in battery discharging actions data store 216. In an example implementation, for performing dynamic analysis of Android apps, dynamic analyzer 212 can be implemented as an instrumented Android emulator that includes a data collector component for collecting Android app related data from the emulator and storing the collected app related data in a data store of battery discharging actions performed by the application during the emulation in the instrumented Android emulator. As another example implementation, for performing dynamic analysis of iOS apps, a jail broken iOS device that is instrumented can similarly be used as an iOS emulator for performing such dynamic analysis to collect and store battery discharging actions performed by the app during the emulation in the instrumented iOS emulator.

Application Classification Engine

In one embodiment, an application classification engine component, shown as 220 in FIG. 2, is a component of system 202 that can classify apps into multiple battery consumption categories based on their behavior/features collected during static analysis and/or dynamic analysis. In an example implementation, the application classification engine can classify apps based on observed behavior(s)/feature(s) in terms of battery usage based on static analysis results 214 and/or dynamic analysis results, shown as battery discharging actions 216, of the analyzed apps and based on training data 218.

In one embodiment, in order to effectively apply app battery consumption classification techniques, battery usage data is initially collected for a large number of apps (e.g., hundreds to thousands of apps of different types, such as productivity apps, game apps, social networking apps, payment apps, and/or other types of apps) that have been analyzed by the emulator over an extended period of time (e.g., 24 hours or longer, and, in some implementations, such initial training can be performed on instrumented actual mobile hardware to facilitate a more accurate battery consumption baseline values for certain app behavior/features monitored during such extended training analysis), and this training data (e.g., shown as training data 218 in FIG. 2) can be joined to the data collected by the static analyzer. For example, the training data can be used by the classification engine to classify, or in other words, estimate the battery consumption score of the app. In some cases, processing the data collected by the static analyzer can provide a great deal of information about the app, marrying that with the behavior data collected by the dynamic analyzer (e.g., battery discharging actions data 216 in FIG. 2) can provide insights into what the app does to a certain extent. Therefore, using static analysis data along with dynamic analyzer collected data can provide an accurate estimate of battery usage by the app. For example, if a dynamic analysis indicates that the app is using a high amount of CPU (e.g., during simulation using the dynamic analyzer, such as by monitoring and tracking CPU usage by the application during the simulation), then that can be fed as input to a static stage of analysis and during a static analysis, any malicious loops can be possibly detected using the static analyzer (e.g., a call graph analysis may identify an infinite loop). Static analysis can also be used to determine steps to attempt to trigger certain behaviors that have been identified with certain battery usage behaviors (e.g., GPS, motion, camera, screen on, etc.), which can then be used to trigger such behaviors in a dynamic stage of analysis using the dynamic analyzer. This is discussed in more detail in the following sections.

For example, the classification engine can be implemented using the Naïve Bayes Algorithm to classify applications with similar battery usage properties (e.g., based on static analyzer examination and/or based on a dynamic analyzer examination of the app for a relatively short period of time, such as five minutes, ten minutes, or another relatively short period of time (shorter than an initial analysis performed on apps to generate initial training data), apply results of that static and/or dynamic analysis to the training data to determine what other apps exhibited similar behavior(s)/feature(s) to estimate a battery consumption score for the new app using the training data and/or to classify the new app into a battery consumption category using the training data). For example, using the Naïve Bayes algorithm with a large training data set can result in accurate detection of similarities between apps that can facilitate accurate estimates of battery consumption categorizations and accurate battery consumption scores, such as further described herein. For instance, based on a set of defined categories in the classifier, in this case critical battery draining behaviors, it is possible to find one or more apps in the training dataset that are closest to the app being analyzed in terms of battery usage. Using that app(s), it is possible to accurately estimate the battery usage score for the app being analyzed. Using this technique significantly expedites the process of battery usage score calculation without decreasing the accuracy of the battery usage score for new apps yet to be analyzed by the system.

Data Collection

In one embodiment, the data collection components of the system (e.g., static analyzer 210 and dynamic analyzer 212 as shown in FIG. 2) are responsible for performing static analysis of apps and performing dynamic analysis of apps to collect the data about the apps, such as feature(s)/behavior(s) associated with each of the apps. As an example, once an app is loaded into the dynamic analyzer, tools that are implemented on the dynamic analyzer can modify the system state by, for example, disabling the Wi-Fi and monitoring how the app behaves in that state, and/or by modifying some other state(s) and monitoring the app behavior in any such other state(s). These tools can also interact with the app in various ways to see how the application would react under certain states.

In some cases, the number of states that are of concern can be limited. In some cases, the state explosion problem may not allow testing under all possible states in an efficient period of time; however, it is possible to test the app under multiple previously known states and monitor the behavior of the app.

For example, once an application is loaded into the system, data about its access to GPS, Wi-Fi, Bluetooth, and/or other access can be extracted from the dynamic analyzer and also its behavior when all the mentioned services are disabled.

In one embodiment, a list of data that is extracted from the data collection phase (e.g., using static analyzer 210 and/or dynamic analyzer 212) can include, for example, the following: GPS access, Bluetooth access, Wi-Fi access, camera access, CPU cycles, airplane mode activation, sync activate/inactive, sound active/inactive, screen on/brightness, wake lock, and/or other behavior(s)/feature(s) that may impact battery consumption of a mobile device.

For example, initially, apps loaded into the dynamic analyzer can be emulated (e.g., executed in certain system states and monitored) for an extended period of time (e.g., at least 24 hours or some other period of time) to increase the accuracy of the data collection to facilitate battery consumption scoring and/or categorization. In some cases, apps could behave differently at different times during the day and also based on how long they have been running on a mobile device. For example, in order to collect such data, apps can be emulated for at least a day (e.g., at least 24 hours or longer) to ensure no such data is lost or missed. In an example implementation, the testing environment can perform various scripts to emulate user interaction with the app during the testing period (e.g., by executing a script(s) in the instrumented emulator that can randomly select commands/ buttons to interact with the app during execution of the app in the testing environment). In one embodiment, the script(s) can be configured to attempt to trigger high battery usage activities that an app can perform (e.g., turn on GPS, turn on screen, turn on speakers, and/or other activities). In another example implementation, users can actually be interacting with the app during the 24-hour testing phase (e.g., using mechanical turks or other user interaction testing techniques).

Expediting Battery Usage Estimation

As discussed above, data collection is typically a slow process when large numbers of apps need to be analyzed to estimate their battery usage. However, using the techniques described herein, it is possible to optimize this process to, for example, a few minutes (e.g., five minutes or other relatively short periods of time, relative to the initial training data periods of time for such initial analysis of apps to populate the training data set) using other techniques of analysis and using historical data about battery usage of multiple apps.

As also discussed above, apps can be emulated using the dynamic analyzer for, for example, at least a day to collect data about their behavior(s)/feature(s) in order to ensure the accuracy of the training data and rule out any time related actions that the app may perform. However, in some cases, due to cost and infrastructural requirements, this often is not feasible for large numbers of applications.

In an example implementation, apps are also processed statically (e.g., using static analyzer 210), and various data about behavior(s)/feature(s) of apps collected from statically analyzing the apps is generated using this static analysis phase, such as described herein. In particular, performing static analysis of a given app can determine what behavior(s)/feature(s) the app is capable of performing. For instance, if the app includes an infinite loop somewhere in the source code, static analysis can detect that infinite loop. The data collected from the dynamic analyzer can also identify what actions the app performs under a number of conditions. Collecting and storing the static analysis data (e.g., in static analysis results data store 214) along with the dynamic analysis data (e.g., in battery discharging actions data store 216) collected from the dynamic analyzer for a large number of apps allows for the use of a classifier of battery usage for all new apps coming into the system and to estimate app battery usage and/or battery usage categorization from the historical data (e.g., training data 218) without executing/analyzing such new apps in the dynamic analyzer for an extended period of time (e.g., such new apps can be analyzed/executed in the dynamic analyzer for 5 minutes instead of 24 hours).

Battery Consumption Classifier

In an example implementation, a battery consumption classifier (e.g., shown as classification engine 120 in FIG. 1 and shown as classification engine 220 in FIG. 2) is implemented using a classification algorithm using static analysis data along with the dynamic analysis data and using the training data can estimate the application closest to the application being analyzed in terms of battery usage. Example classification algorithms include Bayes with term frequency-inverse document frequency (TF-IDF), Bayesian Networks, Decision Trees, and various other semi-supervised machine learning algorithms. For example, the classification engine can be implemented using a Naïve Bayes algorithm.

For example, a first app (app-1) that performs the following: accesses GPS, accesses Wi-Fi, accesses the sound system (e.g., speakers), and has a number of $O(n^2)$ loops can be automatically classified by the classification engine as similar to a second application (app-2) that is being analyzed that performs the following: accesses Wi-Fi, accesses GPS, and has ten $O(n^2)$ loops. Assume that app-1 has scored a relative high battery usage, because app-1 performs some operations that require a large amount of power. As previously discussed, app-2 is similar to app-1 except it does not access the sound system. In this example, it can then be determined that app-1 and app-2 are similar in terms of battery usage having this limited behavior(s)/feature(s) data about app-2.

Accordingly, techniques disclosed herein do not require that new apps be emulated for a long period of time using the dynamic analyzer. Thus, in some cases, it is not necessary to collect all behaviors in an extended analysis/training time period (e.g., 24-hour time period) for new apps, because the partial data from the emulator in combination with the static analysis data can be used to determine how similar the apps are to previously processed apps in terms of battery usage. As a result, this approach enables the system to estimate the battery usage of new apps in an efficient period of time (e.g., in a matter of minutes, such as five minutes or some other relatively short period of time). For example, as discussed above, a classification engine implemented using a Naïve Bayes algorithm (e.g., or other semi-supervised machine learning algorithm) for classifying apps can detect similar apps in terms of battery usage using the various techniques described herein.

Training Data

In one embodiment, training data or historical data (e.g., training data 218) includes data collected from performing dynamic analysis on a large number of applications using the dynamic analyzer for an extended period of time (e.g., for at least 24 hours or some other extended period of time) and also includes static analysis data results of such apps. For example, all newly processed apps can also be added to the training data set (e.g., as shown in FIG. 2 and discussed above) to increase the accuracy of estimations of the battery consumption classifications performed using the classification engine as discussed above. Generally, the larger the training data set, the more accurate the results will be when processing newly analyzed apps and performing the classification using the classification engine based on the training data as would now be apparent to one of ordinary skill in the art.

Calculating an App Battery Consumption Score

In one embodiment, aggregation of all actions/behaviors performed by the app during the dynamic analysis and static analysis results of the apps are used by the battery consumption calculator (e.g., shown as battery consumption calculator 230 in FIG. 2) to calculate a battery consumption score for the app for its battery usage (e.g., shown as app battery consumption score 240 in FIG. 2). For example, on a scale of 0 to 100, a score of 0 may indicate no battery usage with a score of 100 indicating an extremely high battery usage.

For example, an app battery consumption score can be determined from allocating a "discharge value" to each critical action available on mobile devices. Also, based on the training data about app behavior(s)/feature(s), certain structures detected from the source code app can also be allocated a "discharge value." To clarify, the data set below is provided to demonstrate what this data looks like in an example implementation. This data set can include, for example, the following:

| Action | Discharge Value |
| --- | --- |
| GPS | 0.5 |
| Wi-Fi | 0.2 |
| Wake Lock | 0.3 |
| Screen On | 0.8 |
| Camera On (front/back) | 0.9 |
| Bluetooth | 0.3 |
| CPU Cycle | 0.01 |
| Infinite Loops | 0.98 |

Other example actions that can be monitored and allocated a discharge value can include one or more of the following: speaker(s), microphone(s), accelerometer(s), 4G/cellular, near-field communications (NFC), flash of camera, etc.

In an example implementation, a test application can be configured to determine how much battery is used/drained by using each of the above and/or other actions (e.g., GPS, Wi-Fi, wake lock, screen on, camera on (front/back), Bluetooth, CPU cycles, infinite loops, speaker(s), microphone(s), accelerometer(s), 4G/cellular, near-field communications (NFC), flash of camera, etc.) and score appropriate discharge values. In an example test case, if using the GPS for a 24-hour test cycle drains 50% of the battery of a mobile device (e.g., the instrumented mobile device being used for the dynamic analysis test for generating such initial discharge values/scores), then the discharge value for the GPS action can be assigned to be equal to 0.5, and if performing infinite loops for the 24-hour test cycle drains 98% of the battery, then the discharge value for the infinite loop action can be assigned to be equal to 0.98 as shown in the above example action/discharge value chart.

In an example implementation, for iOS apps, the above-described testing data can be performed on each of the current iPhone hardware releases and current iPad releases.

In an example implementation, for Android apps, the above-described testing data can be performed on popular current Android devices and/or devices used by a given entity (e.g., ACME supported/IT compliant Android devices), and the testing data can be correlated based on device and/or averaged across such testing devices.

In some cases, the number of times such actions are performed can also affect the final battery usage score of an analyzed app.

Figure 3:
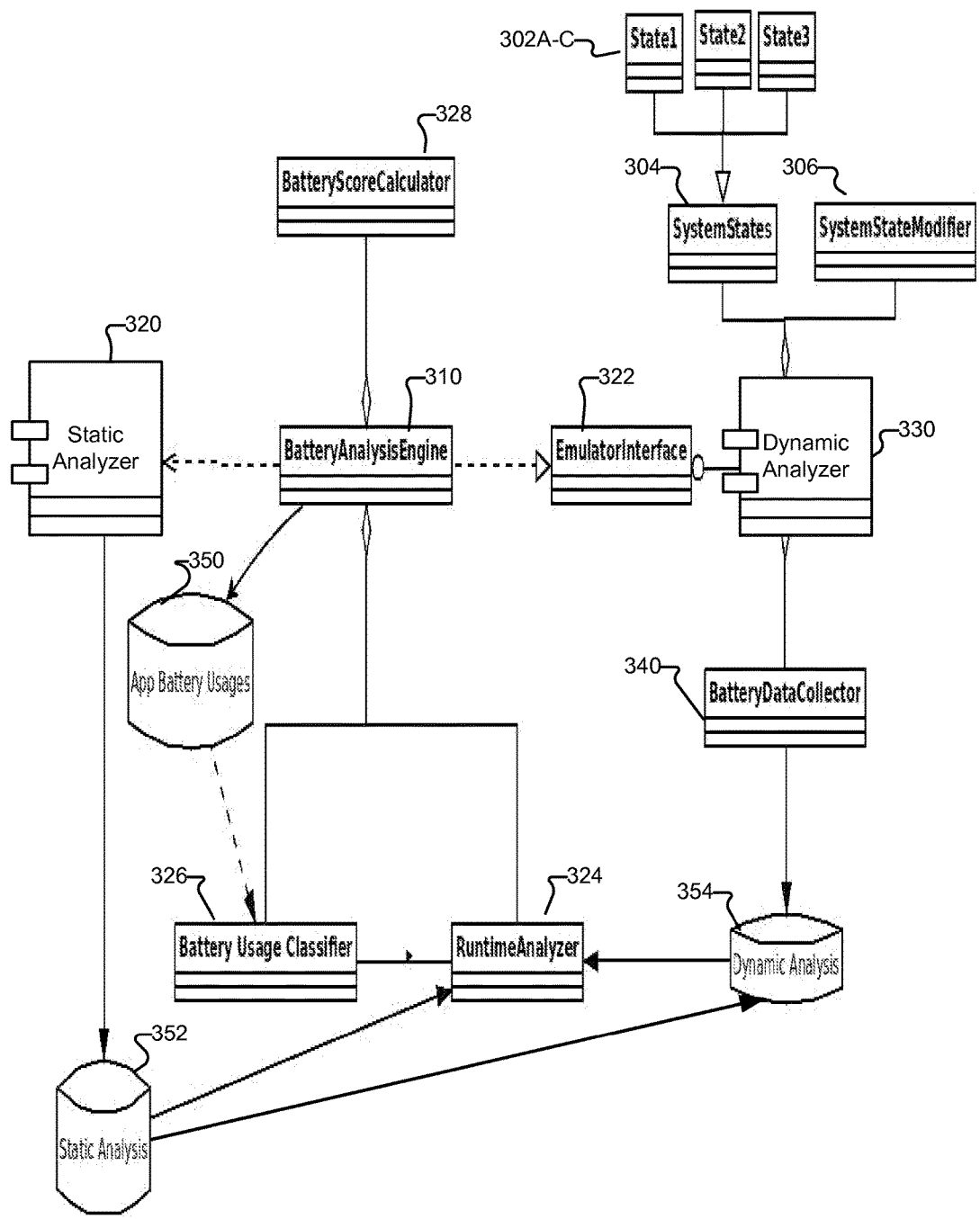
FIG. 3 is a Unified Modeling Language (UML) diagram of the system for providing automated classification of mobile apps battery consumption using simulation in accordance with some embodiments.

Example System Implementation for Performing Automated Classification of Mobile App Battery Consumption Using Simulation FIG. 3 is a Unified Modeling Language (UML) diagram of the system for providing automated classification of mobile apps battery consumption using simulation in accordance with some embodiments. In particular, FIG. 3 illustrates a Unified Modeling Language (UML) diagram that demonstrates the internals of the system and shows how each component of the system interacts with the rest of the system in accordance with some embodiments.

As shown in FIG. 3, in this embodiment, the system includes the following components: a battery analysis engine 310, a static analyzer 320, a dynamic analyzer 330, an emulator interface/API 322, a runtime analyzer 324, a battery usage classifier 326, a battery usage score calculator 328, system states 304 (e.g., state1, state2, state3 are also shown as 302A-C, respectively, provided as input to system states 304), a system state modifier 306, a battery data collector 340, a battery usage (e.g., training data) database 350, a static analysis database 352, and a dynamic analysis (e.g., battery discharging actions) database 354. Each of these components will now be discussed in detail below.

Battery Analysis Engine

In one embodiment, the battery analysis engine component is responsible for coordinating the app battery usage analysis. In one embodiment, the Battery Analysis Engine is the entry point to the system, and it is tasked with determining the runtime required for the app in the emulator, calculating the battery score, updating records in the database related to the app being analyzed, and interacting with the emulator via the emulator interface.

Static Analyzer

In one embodiment, the static analyzer component performs a static analysis phase, such as described herein with respect to various embodiments. In one embodiment, the static analyzer component is implemented as a customized static code analyzer that detects one or more (e.g., in some cases, all) possible execution paths that an app can perform. For example, the static analyzer can detect important patterns in the source code such as inefficient loops, such as infinite or other inefficient loops (e.g., this can be also identified during the dynamic stage of analysis that reveals that the app is not using GPS or other hardware elements, but is using an above-average amount of CPU, such as high CPU usage is detected during the dynamic analysis, which can be analyzed in the static analysis phase to analyze the call graph to detect whether an infinite loop is detected, which can be used to determine that the app is malware, as opposed to an app that is performing legitimate high CPU operations, such as key generation, encrypt/decrypt operations, and/or graphic-processing intensive operations such as a video game, etc.). The data generated by this component can be used by the classifier in determining battery usage, such as described herein.

In one embodiment, static analysis performed by the static analyzer can be used to identify high battery usage functionality that can be executed by the app. As similarly described above, in some implementations, the static analyzer and dynamic analyzer are in communication such that the static analyzer results can be provided as input to the dynamic analyzer. For example, a static analysis can be performed to identify user interaction steps to determine how to trigger certain behaviors that are associated with high battery usage functionality (e.g., how to turn on GPS usage behavior, screen on, camera on, etc.). As such, these techniques facilitate a more efficient and more effective dynamic analysis phase that can be implemented by the dynamic analyzer, such as by determining how to efficiently trigger behaviors to be tested during a short dynamic analysis phase (e.g., during a 5-minute dynamic analysis stage performed using the dynamic analyzer).

Dynamic Analyzer

In one embodiment, the dynamic analyzer component performs a dynamic analysis phase, such as described herein with respect to various embodiments. In one embodiment, for performing dynamic analysis of Android apps, the dynamic analyzer component is implemented as an instrumented Android emulator and/or an instrumented actual Android device(s) can be used for such dynamic analysis testing and, for performing dynamic analysis of iOS apps, the dynamic analyzer component can similarly be implemented using, for example, a jail broken, instrumented iOS device(s) for such dynamic analysis testing.

In one embodiment, a customized dynamic analyzer is responsible for detecting one or more (e.g., in some cases, all) actions performed by the executed app. For example, the emulator can be responsible for collecting all data related to the app and inserting the data in the database using the battery data collector, which is described below.

As similarly described above, in some implementations, the static analyzer and dynamic analyzer are in communication such that one or more dynamic analysis results can be provided to the static analyzer to perform a more targeted and effective static analysis phase, such as similarly described above.

Emulator Interface

In one embodiment, the Emulator Interface component (e.g., an application programming interface (API)) is implemented by the emulator and allows the battery analysis engine to interact with the emulator and perform one or more actions on the app being analyzed (e.g., as needed). For example, an API can be provided that facilitates interactions with the dynamic analysis engine (e.g., to report collected actions performed by an application during a 5-minute, 1-hour, or other period of time for dynamic analysis) using the dynamic analyzer.

Runtime Analyzer

In one embodiment, the runtime analyzer component is responsible for using static analysis data and the app type (e.g., office productivity, game, social networking, payment, or other app type) and determining how long a particular app is to be emulated using the emulator (e.g., using the dynamic analyzer component). As discussed above, once data is collected about a significant number of apps, it is not necessary to run the app for an extended period of time using the emulator.

Battery Usage Classifier

In one embodiment, the battery usage classifier is implemented to use static analysis data and historical data (e.g., training data) about app battery usages and to determine the app's battery usage without requiring that the app be emulated using the emulator (e.g., dynamic analyzer) for a long period of time. For example, this component can interact with the runtime analyzer (e.g., as discussed above) to determine an amount of time (e.g., a minimal amount of time) required for the app to be executed and analyzed in the emulator (e.g., dynamic analyzer). In some cases, using the limited data analysis results from the emulator (e.g., battery discharge actions data results from the dynamic analyzer), static analysis data and historical battery usage data (e.g., training data), the battery usage classifier can estimate an accurate battery usage score for the app.

Battery Score Calculator

In one embodiment, this component is responsible for aggregating all collected data from all components and calculating a score based on the findings about the application.

System States

In one embodiment, the system states component is a generic "state" for the emulator (e.g., dynamic analyzer) that can be changed to any of the predefined set of states (e.g., state-1, state-2 or state-3). For example, these states can increase the accuracy of the battery score calculation.

System State Modifier

In one embodiment, the system state modifier component uses the defined states and modifies the emulator's state to the particular state and executes the app in that state using the emulator (e.g., dynamic analyzer).

Battery Data Collector

In one embodiment, the battery data collector component collects data generated by the execution of the app in the emulator (e.g., dynamic analyzer) and stores that into the dynamic analysis database.

Battery Usage Database

In one embodiment, the battery usage database component stores historical training data.

Static Analysis Database

In one embodiment, the static analysis database component stores static analysis results.

Dynamic Analysis Database

In one embodiment, the dynamic analysis database component stores dynamic analysis data (e.g., battery discharge actions) or data from the emulator (e.g., dynamic analyzer).

Figure 4:
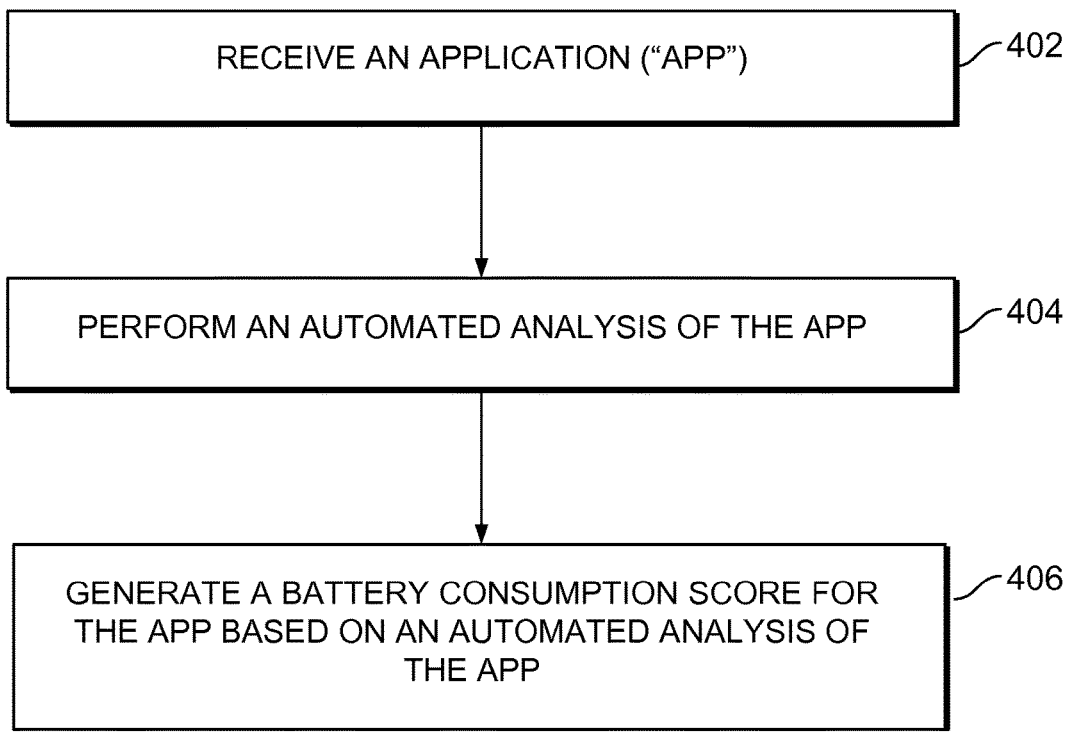
FIG. 4 is a flow diagram illustrating a process for providing automated classification of mobile apps battery consumption using simulation in accordance with some embodiments.

Example Processes for Performing Automated Classification of Mobile App Battery Consumption Using Simulation FIG. 4 is a flow diagram illustrating a process for providing automated classification of mobile apps battery consumption using simulation in accordance with some embodiments. For example, the process can be performed using the cloud service and classification engine described above with respect to FIGS. 1-3.

At 402, an application ("app") is received. For example, an app can be pushed or pulled from an app source (e.g., public or private app store or another app data source) for automated app classification.

At 404, an automated analysis of the app is performed. For example, various feature and behavioral analysis, including both static and dynamic analysis techniques can be performed as described herein with respect to various embodiments.

At 406, a battery consumption score for the app based on the automated analysis of the app is generated. For example, the app can be classified as being similar to another app to determine a battery consumption estimate in order to generate the battery consumption score as described herein with respect to various embodiments. In some implementations, a given app can also be classified into one or more app battery consumption categories.

Figure 5:
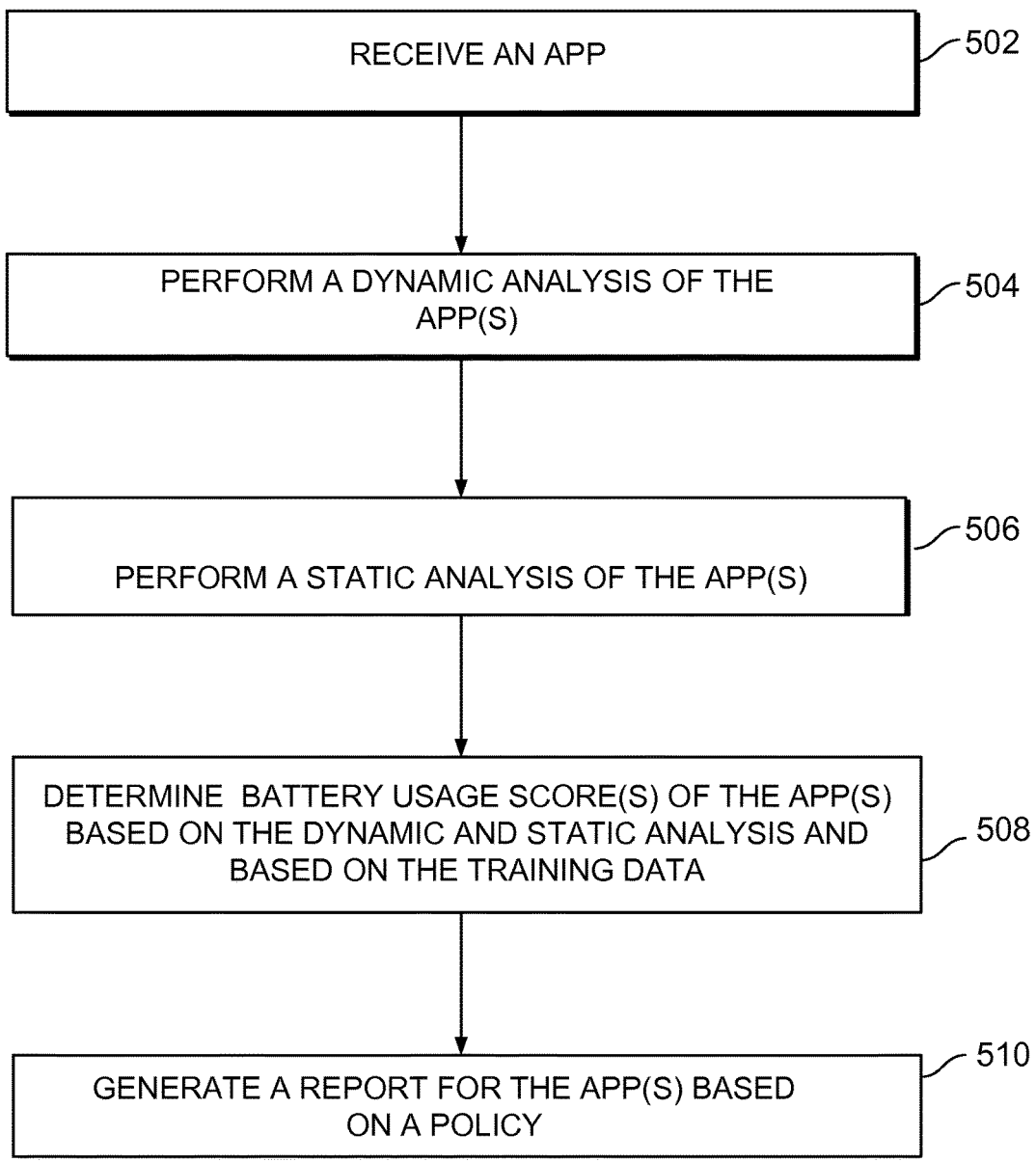
FIG. 5 is another flow diagram illustrating a process for providing automated classification of mobile apps battery consumption using simulation in accordance with some embodiments.

FIG. 5 is another flow diagram illustrating a process for providing automated classification of mobile apps battery consumption using simulation in accordance with some embodiments. For example, the process can be performed using the cloud service and classification engine described above with respect to FIGS. 1-3.

At 502, an application ("app") is received. For example, an app can be pushed or pulled from an app source (e.g., public or private app store or another app data source) for automated app classification.

At 504, a dynamic analysis of the app(s) using a dynamic analyzer is performed. For example, various feature and behavioral analysis using various dynamic analysis techniques can be performed as described herein with respect to various embodiments.

At 506, a static analysis of the app(s) using a static analyzer is performed. For example, various static analysis techniques can be performed as described herein with respect to various embodiments.

At 508, battery usage score(s) of the app(s) is determined (e.g., with a probability value) based on the dynamic and static analysis and based on the training data. For example, the app can be classified with a probability value that the app is associated with a particular battery consumption category using various machine learning algorithms to facilitate an automated app categorization of the app. In an example implementation, the battery consumption categorization can be determined at least in part based on an app behavior (e.g., one or more behaviors performed by the app monitored during execution of the app, such as by monitoring dynamic behavior of the app during execution of the app in an emulation environment), such as described herein with respect to various embodiments.

At 510, a report is generated with at least one battery consumption categorization for the analyzed app(s) and an app battery consumption compliance based on a policy (e.g., an app policy or an enterprise app policy that includes one or more rules/policies for apps based on battery consumption categorizations/scores). For example, the report can identify one or more apps that were determined to be in violation of an app policy and/or an app policy for the entity (e.g., an enterprise app policy) based on battery consumption related rules/policies (e.g., the report can identify the apps and any supporting data that triggered a battery consumption related violation of the policy by such apps, such as which apps are blacklisted based on battery consumption for a given app category (productivity, gaming, social, payment, etc.) and suggested apps that are whitelisted based on battery consumption for that app category, and/or other information, such as why a particular app is blacklisted or in violation of the app policy (high battery consumption and/or high camera battery consumption, etc.)).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for automated classification of mobile applications ("apps") battery consumption using simulation, comprising:
    a processor; and
    a memory coupled with the processor, wherein the memory is configured to provide the processor with instructions which when executed cause the processor to:
        perform an automated analysis of an app;
        generate a battery consumption score for the app based on the automated analysis of the app, comprising to:
            weigh a first action by a first discharge value to obtain a first weighted action score;
            weigh a second action by a second discharge value to obtain a second weighted action score, the first action being different from the second action, the first action and the second action each including at least one of the following actions performed by the app on a device: activating a Global Positioning System (GPS) of the device, activating a wake lock of the device, turning a screen of the device on, turning a front camera of the device on, turning a back camera of the device on, turning Bluetooth of the device on, executing an infinite loop on the device, turning a speaker of the device on, turning on a microphone of the device, activating an accelerometer of the device, activating a near-field communications (NFC) of the device, and activating a flash of a camera of the device; and
            combine the first weighted action score and the second weighted action score to obtain the battery consumption score;
        classify the app into a battery consumption category including a probability of classification of the app into the battery consumption category based on the generated battery consumption score; and
        generate a report with the battery consumption category for the app, wherein the app is not approved based on an app policy, and wherein the report includes at least one suggested app as an alternative to the app based on the app policy.

2. The system recited in claim 1, wherein to classify the app further comprises:
    automatically classifying the app into the battery consumption category.

3. The system recited in claim 1, wherein the battery consumption category includes one from a group of high battery consumption, medium battery consumption, and low battery consumption.

4. The system recited in claim 1, wherein to perform the automated analysis of the app further comprises:
    performing a dynamic analysis of the app.

5. The system recited in claim 1, wherein to perform the automated analysis of the app further comprises:
    performing a dynamic analysis of the app, wherein the dynamic analysis of the app includes triggering a battery discharging action performed by the app.

6. The system recited in claim 1, wherein to perform the automated analysis of the app further comprises:
    performing a static analysis of the app.

7. The system recited in claim 1, wherein to perform the automated analysis of the app further comprises:
    performing a static analysis of the app; and
    performing a dynamic analysis of the app, wherein at least one input to the dynamic analysis of the app is based on results from the static analysis of the app.

8. The system recited in claim 1, wherein the memory is configured to provide the processor with instructions which when executed further cause the processor to:
    generate a training data set, wherein the training data set is generated by performing a dynamic analysis of a plurality of apps to test battery consumption of each of the plurality of apps in a user emulated app execution environment.

9. The system recited in claim 1, wherein the memory is configured to provide the processor with instructions which when executed further cause the processor to:
    generate a report with the battery consumption category for the app.

10. The system recited in claim 1, wherein the memory is configured to provide the processor with instructions which when executed further cause the processor to:
    generate a report with the battery consumption category for the app, wherein the report includes at least one suggested app as an alternative to the app that is not approved based on a battery consumption for the app.

11. The system recited in claim 1, wherein the memory is configured to provide the processor with instructions which when executed further cause the processor to:
    generate a report with the battery consumption category for the app, wherein the app is not approved based on an enterprise app policy, and wherein the report includes at least one suggested app as an alternative to the app based on the enterprise app policy.

12. The system recited in claim 1, wherein the memory is configured to provide the processor with instructions which when executed further cause the processor to:
    generate a report with the battery consumption category for the app, wherein the app is not approved based on an enterprise app policy, wherein the report includes at least one suggested app as an alternative to the app based on the enterprise app policy, and wherein the enterprise app policy is configurable by an enterprise for managing apps on mobile devices associated with the enterprise based on battery consumption categorizations.

13. The system recited in claim 1, wherein the memory is configured to provide the processor with instructions which when executed further cause the processor to:
generate a report with the battery consumption category for the app, wherein the app is not approved based on an app policy, wherein the report includes at least one suggested app as an alternative to the app based on the app policy, wherein the app is a blacklisted app in the app policy based on the battery consumption categorization, and the at least one suggested app is a whitelisted app in the app policy based on the battery consumption categorization.

14. A method of automated classification of mobile applications ("apps") battery consumption using simulation, comprising:
receiving an application ("app");
performing an automated analysis of the app; and
generating a battery consumption score for the app based on the automated analysis of the app, comprising:
weighing a first action by a first discharge value to obtain a first weighted action score;
weighing a second action by a second discharge value to obtain a second weighted action score, the first action being different from the second action, the first action and the second action each including at least one of the following actions performed by the app on a device: activating a Global Positioning System (GPS) of the device, activating a wake lock of the device, turning a screen of the device on, turning a front camera of the device on, turning a back camera of the device on, turning Bluetooth of the device on, executing an infinite loop on the device, turning a speaker of the device on, turning on a microphone of the device, activating an accelerometer of the device, activating a near-field communications (NFC) of the device, and activating a flash of a camera of the device, the first action being different from the second action;
combining the first weighted action score and the second weighted action score to obtain the battery consumption score;
classifying the app into a battery consumption category including a probability of classification of the app into the battery consumption category based on the generated battery consumption score; and
generating a report with the battery consumption category for the app, wherein the app is not approved based on an app policy, and wherein the report includes at least one suggested app as an alternative to the app based on the app policy.

15. The method of claim 14, further comprising:
classifying the app into a battery consumption category based on the battery consumption score.

16. The method of claim 14, wherein the battery consumption category includes one from a group of high battery consumption, medium battery consumption, and low battery consumption.

17. The method of claim 14, further comprising:
performing a dynamic analysis of the app during the automated analysis of the app.

18. A computer program product for automated classification of mobile applications ("apps") battery consumption using simulation, the computer program product being embodied in a tangible non-transitory computer readable storage medium and comprising computer instructions for:
receiving an application ("app");
performing an automated analysis of the app; and
generating a battery consumption score for the app based on the automated analysis of the app, comprising:
weighing a first action by a first discharge value to obtain a first weighted action score;
weighing a second action by a second discharge value to obtain a second weighted action score, the first action being different from the second action, the first action and the second action each including at least one of the following actions performed by the app on a device: activating a Global Positioning System (GPS) of the device, activating a wake lock of the device, turning a screen of the device on, turning a front camera of the device on, turning a back camera of the device on, turning Bluetooth of the device on, executing an infinite loop on the device, turning a speaker of the device on, turning on a microphone of the device, activating an accelerometer of the device, activating a near-field communications (NFC) of the device, and activating a flash of a camera of the device;
combining the first weighted action score and the second weighted action score to obtain the battery consumption score;
classifying the app into a battery consumption category including a probability of classification of the app into the battery consumption category based on the generated battery consumption score; and
generating a report with the battery consumption category for the app, wherein the app is not approved based on an app policy, and wherein the report includes at least one suggested app as an alternative to the app based on the app policy.

19. The system recited in claim 1, wherein the first action and the second action each includes at least three of the following actions performed by the app on a device:
activating a Global Positioning System (GPS) of the device, activating a wake lock of the device, turning a screen of the device on, turning a front camera of the device on, turning a back camera of the device on, turning Bluetooth of the device on, executing an infinite loop on the device, turning a speaker of the device on, turning on a microphone of the device, activating an accelerometer of the device, activating a near-field communications (NFC) of the device, and activating a flash of a camera of the device.

* * * * *